United States Patent
Odenheimer et al.

(10) Patent No.: US 9,182,979 B2
(45) Date of Patent: Nov. 10, 2015

(54) SOCIAL CODING EXTENSIONS (71) Applicants: Jens Odenheimer, Karlsruhe (DE); Peter Eberlein, Malsch (DE)

(72) Inventors: Jens Odenheimer, Karlsruhe (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/873,075

(22) Filed: Apr. 29, 2013

(65) Prior Publication Data
US 2014/0325336 A1 Oct. 30, 2014

(51) Int. Cl.
*G06F 9/44* (2006.01)
*G06Q 10/10* (2012.01)
*G06Q 50/00* (2012.01)

(52) U.S. Cl.
CPC .............. *G06F 8/71* (2013.01); *G06Q 10/101* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 5,649,200 A * | 7/1997 | Leblang et al. | ............... | 717/122 |
| 6,083,278 A * | 7/2000 | Olson et al. | .................... | 717/113 |
| 6,389,481 B1 * | 5/2002 | Malcolm | ....................... | 719/310 |
| 6,457,176 B1 * | 9/2002 | King | .............................. | 717/173 |
| 6,467,080 B1 * | 10/2002 | Devine et al. | ................. | 717/123 |
| 6,467,081 B2 * | 10/2002 | Vaidyanathan et al. | ...... | 717/123 |
| 6,507,855 B1 * | 1/2003 | Stern | ............................. | 715/234 |
| 6,681,382 B1 * | 1/2004 | Kakumani et al. | ............ | 717/122 |
| 6,698,013 B1 * | 2/2004 | Bertero et al. | ................ | 717/127 |
| 6,993,487 B2 * | 1/2006 | Bluvband | ..................... | 704/275 |
| 8,341,600 B2 * | 12/2012 | Sutherland et al. | ........... | 717/126 |
| 8,438,468 B2 * | 5/2013 | Berg et al. | ...................... | 715/230 |
| 8,510,706 B1 * | 8/2013 | Bartlett | ......................... | 717/105 |
| 8,516,463 B2 * | 8/2013 | Oliva | ............................. | 717/151 |
| 2002/0029231 A1 * | 3/2002 | Aptus et al. | ................... | 707/513 |
| 2002/0062477 A1 * | 5/2002 | Sasaki | ........................... | 717/136 |
| 2002/0133806 A1 * | 9/2002 | Flanagan et al. | .............. | 717/123 |
| 2003/0182652 A1 * | 9/2003 | Custodio | ....................... | 717/122 |
| 2004/0061719 A1 * | 4/2004 | Barsness et al. | .............. | 345/760 |
| 2004/0186817 A1 * | 9/2004 | Thames et al. | .................... | 707/1 |
| 2005/0005258 A1 * | 1/2005 | Bhogal et al. | ................. | 717/102 |
| 2005/0229156 A1 * | 10/2005 | Baumann | ...................... | 717/110 |
| 2006/0020928 A1 * | 1/2006 | Holloway et al. | ............. | 717/136 |
| 2006/0059457 A1 * | 3/2006 | Pandit | ........................... | 717/106 |
| 2006/0271917 A1 * | 11/2006 | Das et al. | ...................... | 717/130 |

(Continued)

OTHER PUBLICATIONS

"The Next Frontier of Software Development: Social Coding for Subversion", Wandisco, May 2011, <http://www.wandisco.com/press-releases/next-frontier-software-development-social-coding-for-subversion>, pp. 1-4.*

Alexey Zagalsky et al., "Example Overflow: Using Social Media for Code Recommendation", IEEE, 2012, <http://ieeexplore.ieee.org/stamp/stamp.jsp?tp=&arnumber=6233407>, pp. 1-5.*

(Continued)

*Primary Examiner* — Thuy Dao
*Assistant Examiner* — Samuel Hayim
(74) *Attorney, Agent, or Firm* — Mintz Levin Cohn Ferris Glovsky and Popeo, P.C.

(57) ABSTRACT

In some example implementations, there is provided a method. The method may include generating a first page for presentation at a user interface, wherein the first page further comprises a first portion presenting one or more lines of code being developed and a toolbar portion, wherein the toolbar portion includes a comment element configured to generate a comment window and a propose change element configured to generate a change window; and receiving, in response to the generated first page, metadata including at least one of a comment and a proposed change associated with the one or more lines of code. Related systems, methods, and articles of manufacture are also provided.

15 Claims, 8 Drawing Sheets

(56) References Cited

U.S. PATENT DOCUMENTS

| | | | |
|---|---|---|---|
| 2006/0282458 A1* | 12/2006 | Tsyganskiy et al. | 707/102 |
| 2009/0210855 A1* | 8/2009 | Ramanathan | 717/102 |
| 2009/0210860 A1* | 8/2009 | Sutherland et al. | 717/123 |
| 2011/0283252 A1* | 11/2011 | Chen et al. | 717/102 |
| 2013/0283233 A1* | 10/2013 | Castellanos et al. | 717/113 |

OTHER PUBLICATIONS

Laura Dabbish et al., "Social Coding in GitHub: Transparency and Collaboration in an Open Software Repository", ACM, 2012, <http://delivery.acm.org/10.1145/2150000/2145396/p1277-dabbish.pdf>, pp. 1-10.*

* cited by examiner

SOCIAL CODING EXTENSIONS

TECHNICAL FIELD

This disclosure relates generally to systems for developing code.

BACKGROUND

Code development is considered an extremely complex process. So it is not surprising that code development is commonly done in teams. The coders in the team may be assigned portions of code to develop. And, at some point, these portions are combined and compiled into executable code, which when executed provides a system, such as an enterprise resource planning system and/or any other type of system as well. To reduce errors and enhance quality, team code development may also utilize pair wise coding, which refers to code being developed by at least a pair of coders working together. For example, a first coder may write a portion of code, which is then checked by a second coder.

SUMMARY

In some example implementations, there is provided a method. The method may include generating a first page for presentation at a user interface, wherein the first page further comprises a first portion presenting one or more lines of code being developed and a toolbar portion, wherein the toolbar portion includes a comment element configured to generate a comment window and a propose change element configured to generate a change window; receiving, in response to the generated first page, metadata including at least one of a comment and a proposed change associated with the one or more lines of code; forwarding via a social medium a second page for presentation, wherein the second page further comprises the first portion presenting the one or more lines of code being developed and a window including the at least one of the comment and the proposed change presented in the window associated with the one or more lines of code, wherein the window includes an element to allow the at least one of the comment and the proposed change to be at least one of accepted, rejected, or acknowledged; and receiving, in response to the generated second page, additional metadata including information representative of whether the at least one of the comment and the proposed change being accepted, rejected, or acknowledged, wherein the generating, the receiving metadata, the forwarding, and the receiving additional metadata are implemented by at least one processor.

In some variations, one or more of the features disclosed herein including the following features can optionally be included in any feasible combination. The comment window may include at least one of a rating, the proposed change comprising an alternative to the one or more lines of code, or a textual comment. The comment window may be presented adjacent to the one or more lines of code. The received metadata may identify the one or more lines of code, the comment, the proposed change, an identity of an originator of at least one of the comment or the proposed change, and an author of the one or more lines of code. When the proposed change is accepted, the one or more lines of code may be replaced with the proposed change. The metadata and the additional metadata may be deleted before delivering the one or more lines of code.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Code is often developed using a team of coders working together to complete the code for a system. Moreover, coders often work in pairs, where one coder writes code and another verifies the code. However, there is a need to provide a way for coders on a team to easily comment and offer changes to code and then share the comments/changes with others. To that end, the subject matter disclosed herein relates to providing social media to a code development system to facilitate team coding. In some example implementations, social media allows a coder in the team to disseminate comments on a portion of the code being developed, rate a portion of the code being developed, correct a portion of the code being developed, offer suggested changes to a portion of the code being developed, and/or the like. As such, social media may, in some example implementations, facilitate team code development including the above-noted pair-based coding technique.

Figure 1:
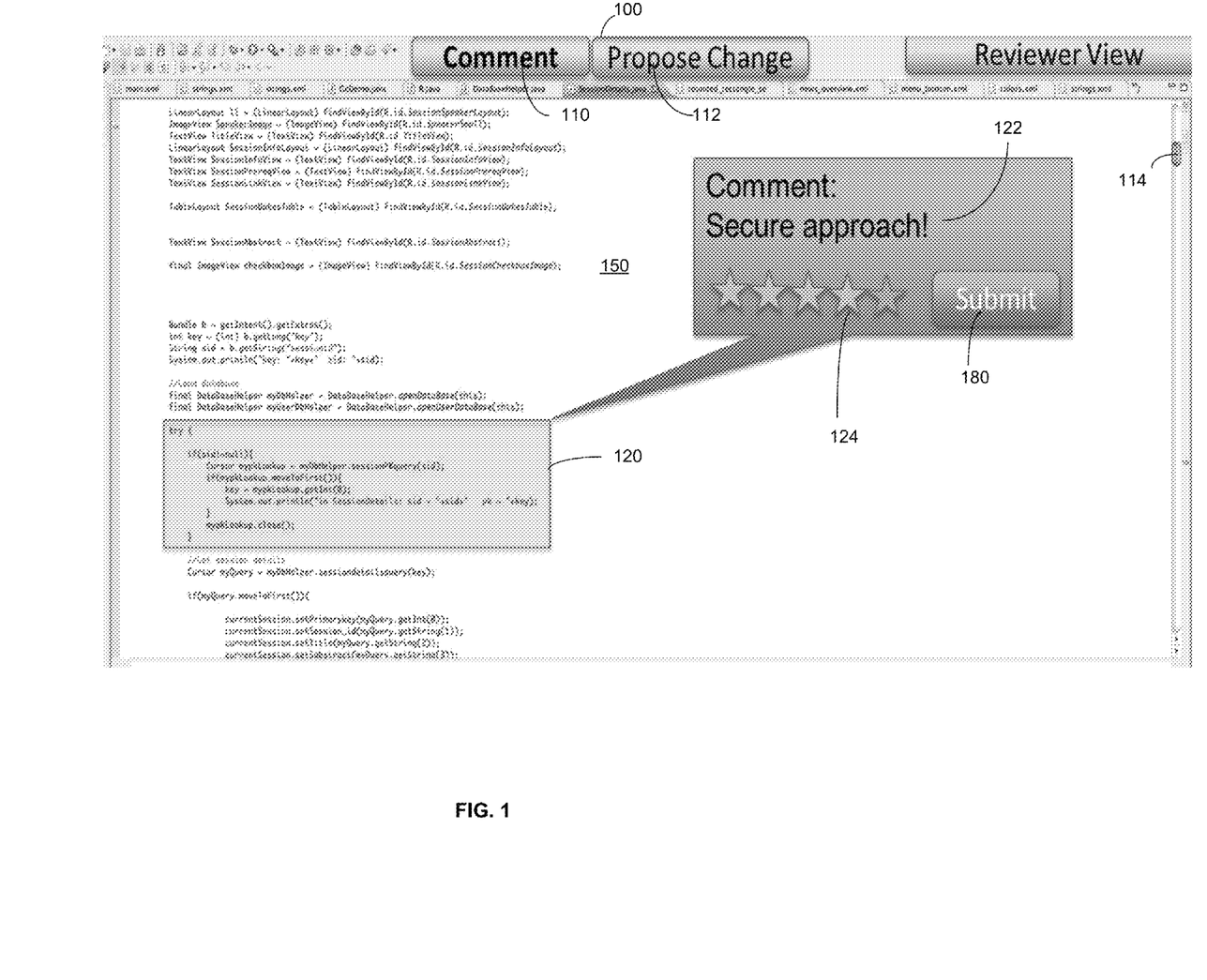
FIGS. 1 and 2 illustrate examples of reviewer pages, according to some implementations of the current subject matter.

FIG. 1 depicts a page 100 presented to a reviewer (hereinafter referred to as a reviewer page 100). The reviewer page 100 may be generated by a code development tool used by a team developing code for a system.

Referring to FIG. 1, reviewer page 100 may include a toolbar 160 including a comment user interface element 110 and a propose change user interface element 112. A user/reviewer may review code 150 presented at reviewer page 100 and scroll through the code by for example moving a user interface element 114, which when moved up scrolls up through the code 150 and when user interface element 114 is moved down scrolls down through the code 150. Although the previous example describes using user interface element 114 to move through code 150 under development, other actions may be performed via a user interface to scroll through the code as well.

When the comment user interface element 110 is selected, a user can select and highlight 120 one or more lines of code and then insert a comment 122. The comment 122 may include a word, a phrase, or a rating 124 to provide an indication of quality. In the example of FIG. 1, the rating is 4 out of 5 stars, where 5 stars is the highest rating, although other rating schemes may be used.

As a user/reviewer scrolls though code 150, one or more comments, such as comment 122, can be associated with the code 150. And, the comments and associated code may be stored as metadata as described further below. In some example implementations, the comment 122 may be shared with others including the coder/developer of the code 120 that is the subject of comment 122. For example, a reviewer may select submit 180 to share the comment to others including the coder/developer of code portion 120. Moreover, the sharing may be via a social networking component described further below.

Figure 2:
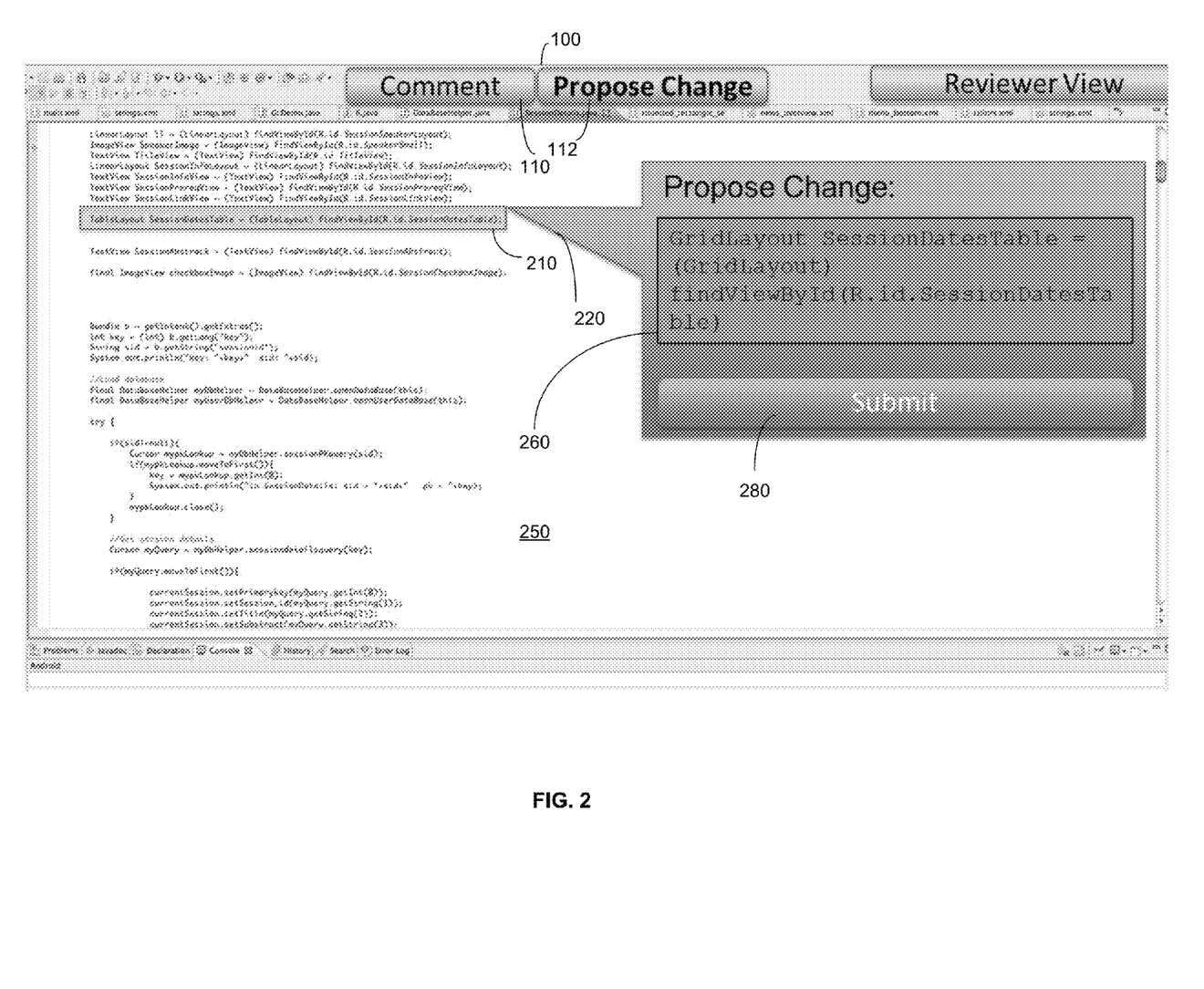

If a reviewer wants to propose a change, this reviewer/user may select propose change user interface element 112. FIG. 2 depicts a reviewer page 100 after propose change user interface element 112 has been selected. In the example of FIG. 2, a user/reviewer may scroll through code 250 being reviewed and when a portion of code 210 is identified for a proposed change, the code portion 210 may be highlighted and a window 220 may appear so that the reviewer can propose a change as shown at 260.

In some example implementations, the one or more proposed changes, such as proposed change 260, may be shared with others including the coder/developer of the code 210 that is the subject of the proposed change 260. For example, a reviewer may select submit 280 to share proposed changes with others including the coder/developer of the code portion 210. And, the proposed changes and associated code may be stored as metadata as described further below. Moreover, this sharing may be via a social networking component described further below.

Figure 3:
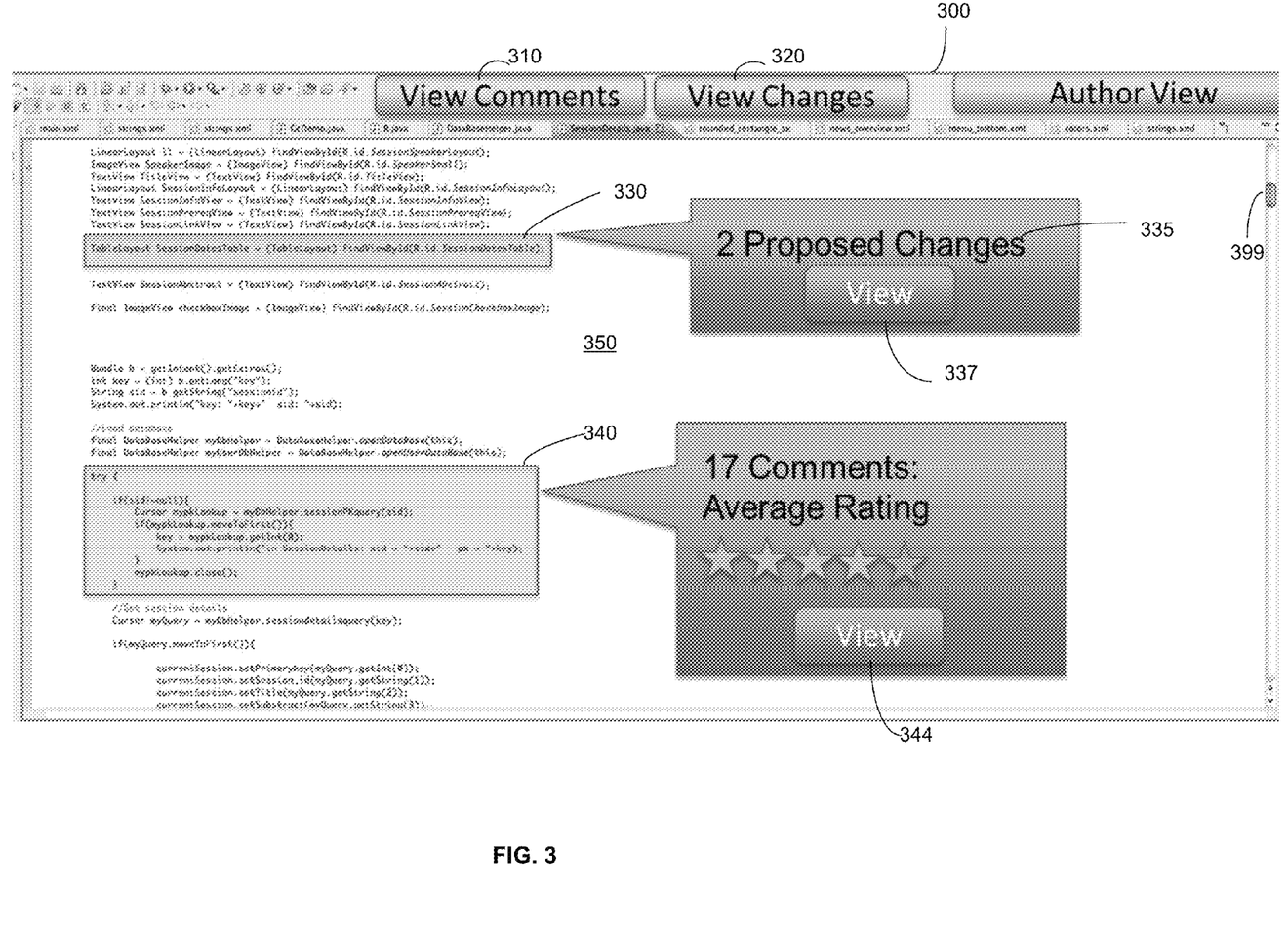
FIGS. 3, 4, and 5 illustrate examples of author pages, according to some implementations of the current subject matter.

FIG. 3 depicts a page 300 presented to a developer, such as an author, of code 350 being developed. As an author or developer scrolls through code 350 (for example, by moving vertical scrolling element 399), the author/developer can see comments 342, proposed changes 335, and the like submitted by others via the reviewer page. In the example of FIG. 3, a code portion 330 includes 2 proposed changes, and code portion 340 includes 17 comments 342.

Selection of view comments 310 may filter page 300, so that only comments are presented, and selection of view changes 320 may filter page 300, so that only changes are presented.

Figure 4:
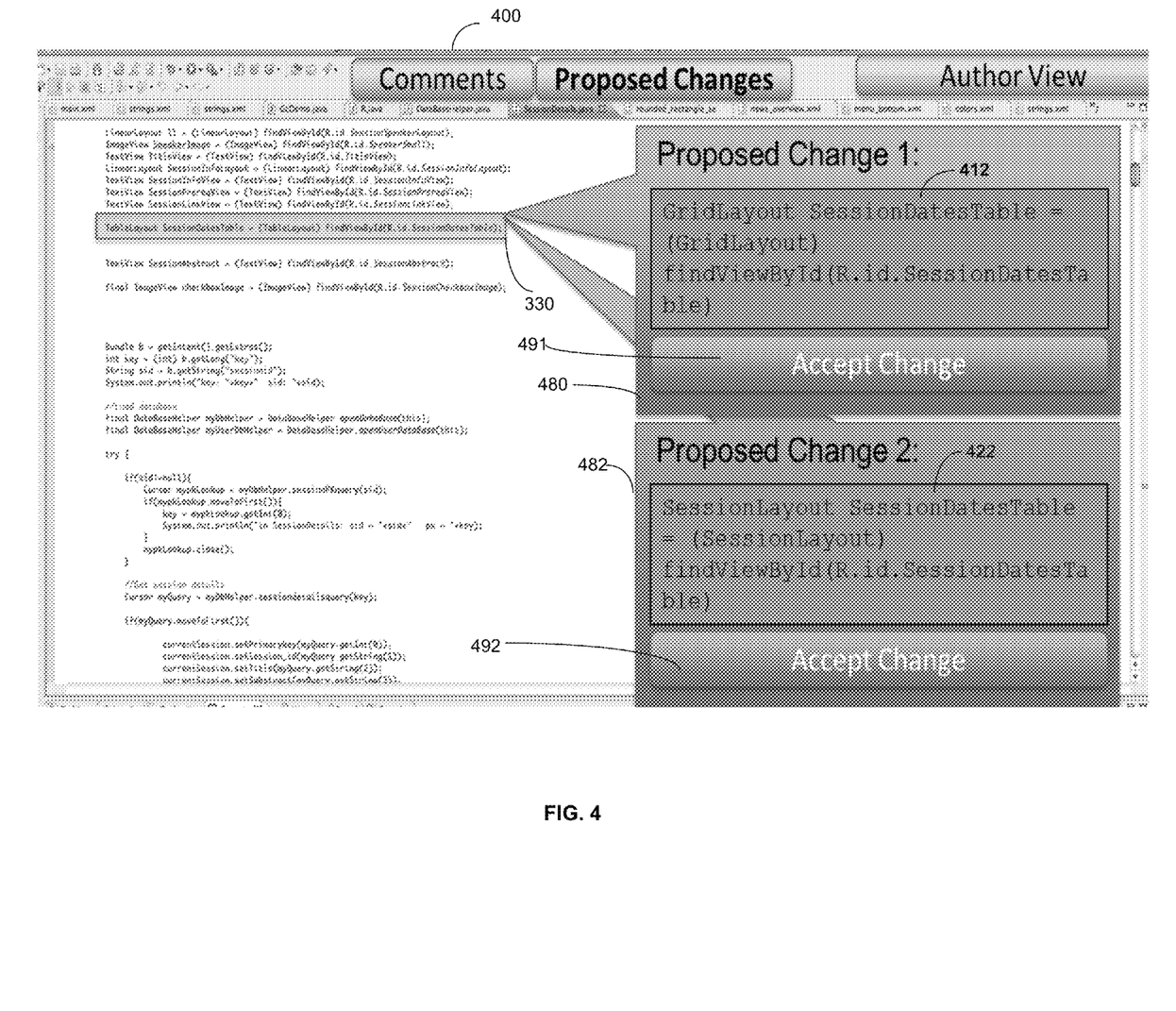

Selection of view changes 337 at FIG. 3 presents changes in other windows 480 and 482 presented adjacent to the associated code portion 330, as shown at FIG. 4. Referring to FIG. 4, the first proposed change 412 is depicted in window 480, and the second proposed change 422 is depicted in window 482, although other quantity of changes may be viewed as well. A user/author/developer can accept one or both of the proposed changes 480 and/or 482 by selecting "accept change" at 491 and 492. For example, selecting accept change 491 accepts the change 412 and replaces code portion 330 with the code portion at 412. These changes may be stored and tracked metadata as described further below.

Referring again to FIG. 3, in some example implementations of page 300, comments and ratings may be configured in accordance with a predefined color code scheme to see the relative importance of the comment.

Figure 5:
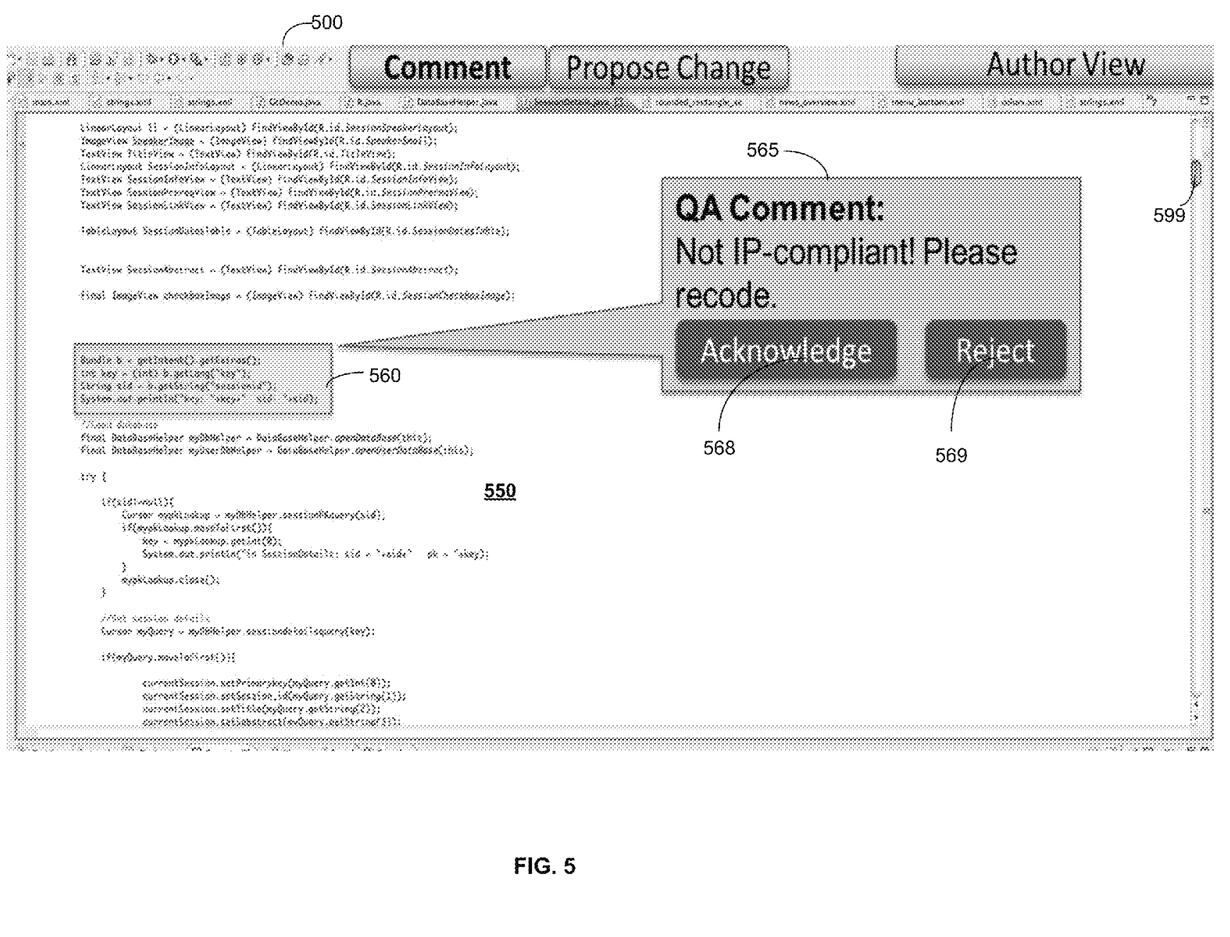

Selection of the view 344 at FIG. 3 may cause a page with comments to be presented. FIG. 5 depicts an example of a comments page 500 presented to an author/developer, such as a developer of code 550 including a portion of code 560. This author view page 500 may present code 550, and as a user scrolls through the code (for example, by moving vertical scrolling element 599), the author/developer can see any comments, proposed changes, and the like submitted by others. In the example of FIG. 5, a code portion 560 includes a comment in window 565, although other comments may be viewed as well by for example scrolling down via user interface element 599. The comment can be acknowledged by selecting 568 or rejected at 569. And, the acknowledgements and/or may be stored as metadata as described further below.

Figure 6:
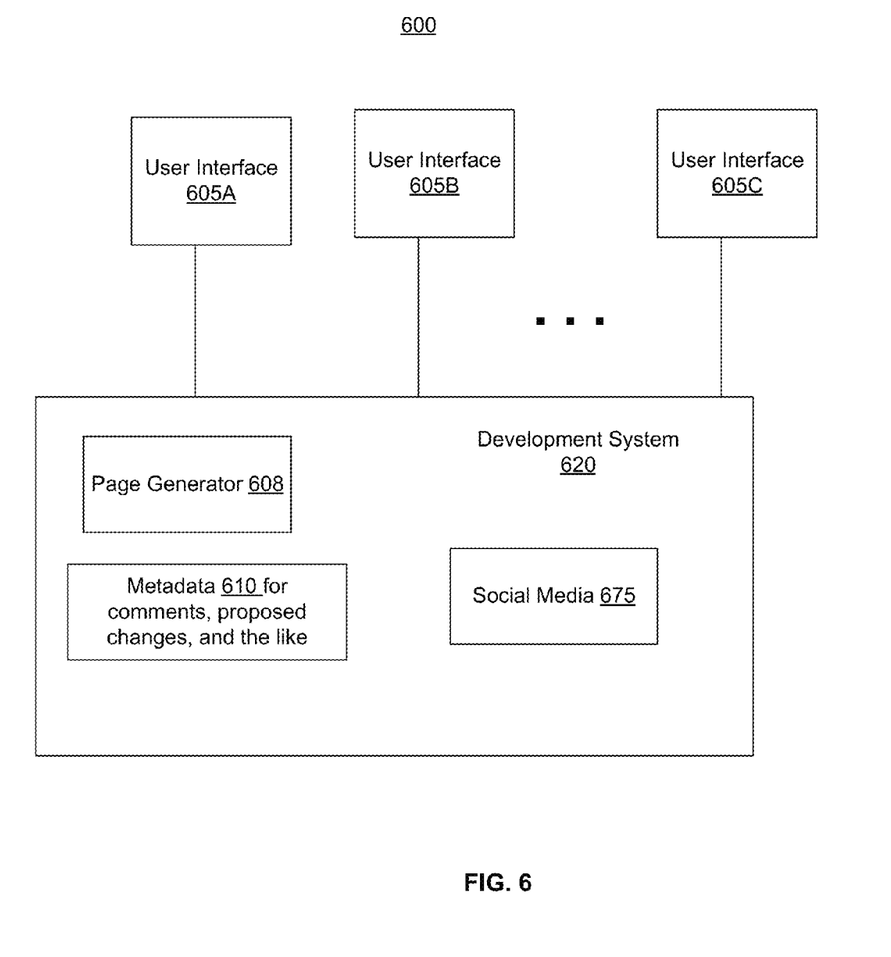
FIG. 6 illustrates an example of a system, according to some implementations of the current subject matter.

FIG. 6 depicts a system 600, in accordance with some example implementations. The system 600 includes one or more user interfaces 605A-C. The user interfaces 605A-C may be implemented as any type of user interface. However, in some example implementations, the user interfaces 605A-C include a browser, a smart client, and the like implemented on a computer or other processor-based device. Moreover, the user interfaces 605A-C may be used by a team of coders developing code for a system. The code being developed is stored and accessed from a development system 620.

The development system 620 may comprise a code development platform including a page generator 608. Page generator 608 may generate pages, such as HTML pages and the like, for presentation at user interfaces 605A-C. Examples of pages are also depicted at FIGS. 1-5.

The development system 620 may comprise metadata 610. The metadata 610 may include comments, suggested changes, ratings, identity of reviewers/commentators, and other information provided by users associated with developing code. The comments, suggested changes, ratings, and the like may be linked to (e.g., associated with) a specific portion of code, a specific developer (also referred to as author) of that specific portion of code, or a specific reviewer. The metadata may also identify the locations (for example, email addresses, aliases, internet protocol address, and the like) of the authors and reviewers to enable for example disseminating changes, comments, and code for review via social networking media. This metadata may be kept separate from the code being developed, so that when the code is completed and ready for final quality control and delivery, coder/developer comments and the like can be removed and thus not delivered to an end-user of the system formed by the compiled code developed by the team of coders.

The development system 620 may comprise social media 675. Social media 675 may include instant messaging, e-mail, short message service feeds, updates from shared storage media services, and any other electronic medium for sharing information among the coder accessing system 600 including user interfaces 605A-C. For example, when a reviewer submits comments at 180 at FIG. 1, the comments may be pushed to development system 620 and social media 675, which forwards the comment to a user interface, such as user interface 605A, associated with the author/coder responsible for the commented portion of the code. Moreover, metadata may define where to forward the comment or change. For example, the metadata may define the identity of the author/coder responsible for the code and the author/coder's current location/address for forwarding. This forwarding may be performed via instant messaging, emails, or any other social medium.

Figure 7:
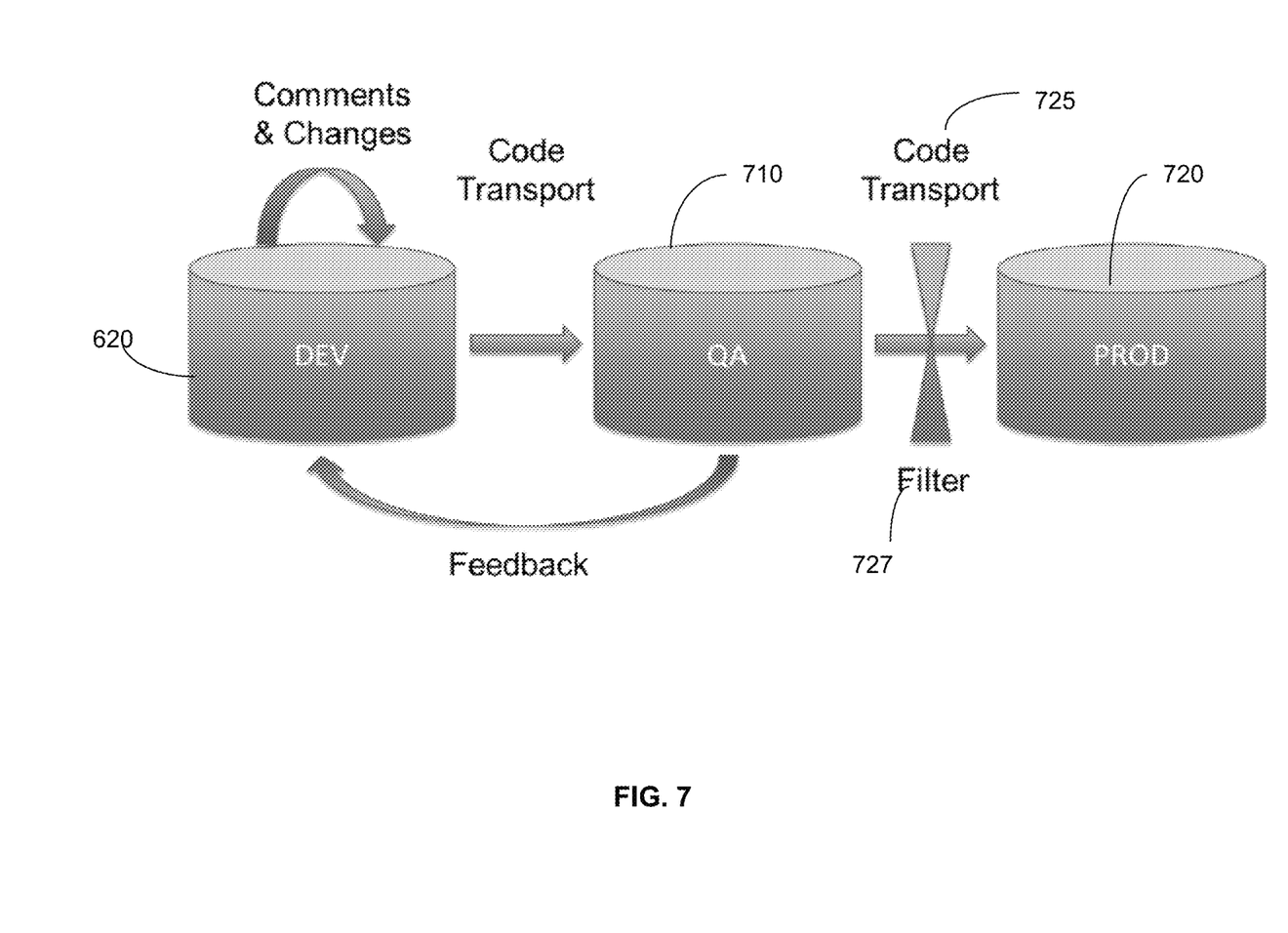
FIG. 7 depicts an example of a development process, according to some implementations of the current subject matter.

FIG. 7 depicts an example of overview of a code development process. Code being development in the development system 620 may be commented, reviewed, and/or changed as disclosed herein. There may be one or more cycles of comment, review, and changes. At a certain point, the code under development may be transported to another system 710, where comments, review, and changes may also be provided as disclosed herein, and those comments, review, and changes may be provided to system 620 as metadata 610 to allow the author/development to review any comments, review, and/or changes as described above at FIGS. 3 and 4. At some point, the code under development is sent to another system 720, which represents a production system typically associated with an end-user operating the system 720. However, code transport 725 may include filtering 727 out any comments, review, and/or changes generated during the development and quality assurance (QA) phases of code development.

Figure 8:
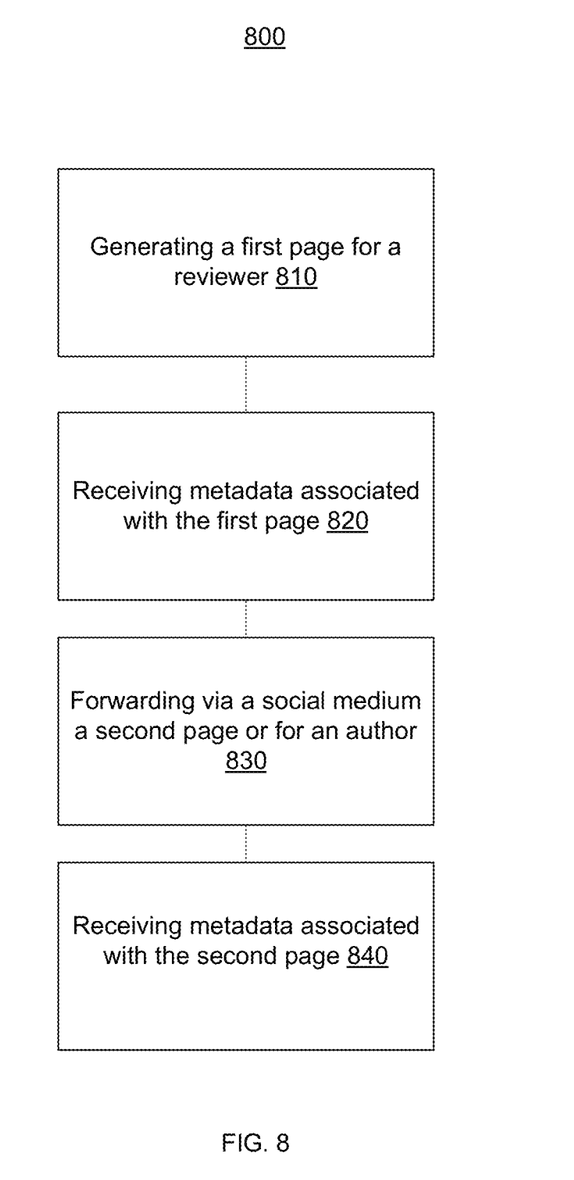
FIG. 8 depicts an example of a process, according to some implementations of the current subject matter.

FIG. 8 depicts an example of a process 800 for social coding, in accordance with some example implementations. The description of process 800 also refers to FIGS. 1-6.

At 810, a first page may be generated for a reviewer. For example, page, such as reviewer page 100, may be generated by page generator 608. Moreover, the page 100 may include a toolbar 160 including a comment element 110 and a propose change element 112 as described above. Further, the page 100 may include one or more lines of code 150 being developed, and being made available at for review and comment via page 100.

At 820, metadata may be received. For example, when any changes or comments are made via page 100, this may be provided to development system 620 as metadata associated with the code under development.

At 830, a second page may be forwarded via a social medium, such as email, a social networking feed, instant messaging, and the like. The forwarding of a page may comprise forwarding the actual page or forwarding a representation of the page (or portion thereof), such as forwarding a link to a location where the page may be accessed. Furthermore, the second page may be forwarded via a social medium. The second page, such as author page 300, may be generated for presentation at a user interface, such user interfaces 605A-C. Moreover, page 300 may include one or more windows and a first portion presenting one or more lines of code 350 being developed by an author/code/user. These windows may include a comment, such as comment 565 and/or a proposed change, such as change 412. Moreover, these windows may include an element to allow the comment and/or proposed changes to accepted 491, rejected 569, or acknowledged 568.

At 840, additional metadata may be received. For example, when any changes or comments are made via pages 400 and 500, the changes or comments may be provided to development system 620 as metadata associated with the code under development.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A method, comprising:
    generating a first page for presentation of a reviewer view at a user interface, wherein the first page further comprises a first portion presenting one or more lines of code and a toolbar portion, wherein the toolbar portion includes a comment element configured to generate a comment window and a propose change element configured to generate a change window;
    receiving, in response to the generated first page and a first selection of at least one of the comment element or the propose change element, metadata including at least one of a comment and a proposed change associated with the one or more lines of code;
    forwarding via a social medium a second page for presentation of an author view, wherein the second page further comprises the first portion presenting the one or more lines of code, a first window, and a second window, wherein the first window includes the comment and the second window includes the proposed change adjacent to the one or more lines of code, wherein the first window and the second window include a first element, a second element, and a third element, wherein the first element when selected accepts the comment and/or the proposed change to the one or more lines of code, wherein the second element when selected acknowledges the comment and/or the proposed change, and a third element when selected rejects the comment and/or the proposed change; and
    receiving, in response to the generated second page and a second selection of at least one of the first element, the second element, or the third element, additional metadata including information representative of whether the comment and/or the proposed change is being accepted, rejected, or acknowledged,
    deleting the metadata and the additional metadata before delivering the one or more lines of code, wherein the generating, the receiving metadata, the forwarding, the receiving additional metadata, and the deleting are implemented by at least one processor.

2. The method of claim 1, wherein the comment window includes at least one of a rating, wherein the proposed change comprises an alternative to the one or more lines of code or a textual comment.

3. The method of claim 1, wherein the comment window is presented adjacent to the one or more lines of code.

4. The method of claim 1, wherein the received metadata identifies the one or more lines of code, the comment, the proposed change, an identity of an originator of at least one of the comment or the proposed change, and an author of the one or more lines of code.

5. The method of claim 1 further comprising:
    replacing, when the proposed change is accepted, the one or more lines of code with the proposed change.

6. A non-transitory computer-readable storage medium including computer code, which when executed by at least one processor provides operations comprising:
    generating a first page for presentation of a reviewer view at a user interface, wherein the first page further comprises a first portion presenting one or more lines of code and a toolbar portion, wherein the toolbar portion includes a comment element configured to generate a comment window and a propose change element configured to generate a change window;
    receiving, in response to the generated first page and a first selection of at least one of the comment element or the propose change element, metadata including at least one of a comment and a proposed change associated with the one or more lines of code;
    forwarding via a social medium a second page for presentation of an author view, wherein the second page further comprises the first portion presenting the one or more lines of code, a first window, and a second window, wherein the first window includes the comment and the second window includes the proposed change adjacent to the one or more lines of code, wherein the first window and the second window include a first element, a second element, and a third element, wherein the first element when selected accepts the comment and/or the proposed change to the one or more lines of code, wherein the second element when selected acknowledges the comment and/or the proposed change, and a third element when selected rejects the comment and/or the proposed change; and
    receiving, in response to the generated second page and a second selection of at least one of the first element, the second element, or the third element, additional metadata including information representative of whether the comment and/or the proposed change is being accepted, rejected, or acknowledged,
    deleting the metadata and the additional metadata before delivering the one or more lines of code.

7. The non-transitory computer-readable storage medium of claim 6, wherein the comment window includes at least one of a rating, wherein the proposed change comprises an alternative to the one or more lines of code or a textual comment.

8. The non-transitory computer-readable storage medium 6, wherein the comment window is presented adjacent to the one or more lines of code.

9. The non-transitory computer-readable storage medium of claim 6, wherein the received metadata identifies the one or more lines of code, the comment, the proposed change, an identity of an originator of at least one of the comment or the proposed change, and an author of the one or more lines of code.

10. The non-transitory computer-readable storage medium of claim 6 further comprising:
   replacing, when the proposed change is accepted, the one or more lines of code with the proposed change.

11. A system comprising:
   at least one processor; and
      at least one memory including code, which when executed by at least one processor provides operations comprising:
      generating a first page for presentation of a reviewer view at a user interface, wherein the first page further comprises a first portion presenting one or more lines of code and a toolbar portion, wherein the toolbar portion includes a comment element configured to generate a comment window and a propose change element configured to generate a change window;
      receiving, in response to the generated first page and a first selection of at least one of the comment element or the propose change element, metadata including at least one of a comment and a proposed change associated with the one or more lines of code;
      forwarding via a social medium a second page for presentation of an author view, wherein the second page further comprises the first portion presenting the one or more lines of code, a first window, and a second window, wherein the first window includes the comment and the second window includes the proposed change adjacent to the one or more lines of code, wherein the first window and the second window include a first element, a second element, and a third element, wherein the first element when selected accepts the comment and/or the proposed change to the one or more lines of code, wherein the second element when selected acknowledges the comment and/or the proposed change, and a third element when selected rejects the comment and/or the proposed change; and
      receiving, in response to the generated second page and a second selection of at least one of the first element, the second element, or the third element, additional metadata including information representative of whether the comment and/or the proposed change is being accepted, rejected, or acknowledged,
   deleting the metadata and the additional metadata before delivering the one or more lines of code.

12. The system of claim 11, wherein the comment window includes at least one of a rating, wherein the proposed change comprises an alternative to the one or more lines of code or a textual comment.

13. The system of claim 11, wherein the comment window is presented adjacent to the one or more lines of code.

14. The system of claim 11, wherein the received metadata identifies the one or more lines of code, the comment, the proposed change, an identity of an originator of at least one of the comment or the proposed change, and an author of the one or more lines of code.

15. The system of claim 11 further comprising:
   replacing, when the proposed change is accepted, the one or more lines of code with the proposed change.

\* \* \* \* \*